Jan. 29, 1935. G. B. WATKINS 1,989,388
PROCESS AND APPARATUS FOR PRODUCING SAFETY GLASS
Filed Nov. 14, 1931 2 Sheets-Sheet 1
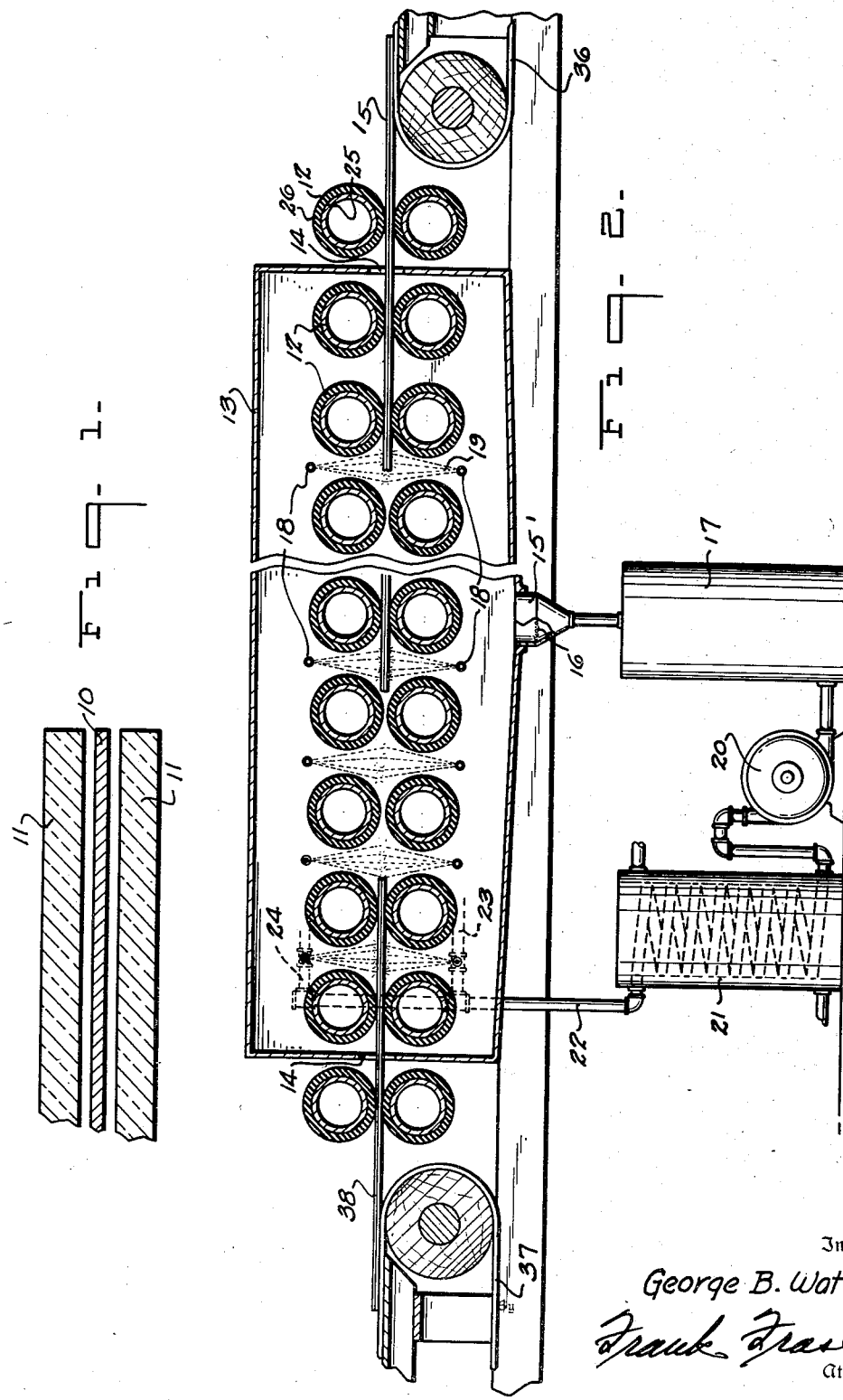
Inventor
George B. Watkins.
Frank Fraser
Attorney

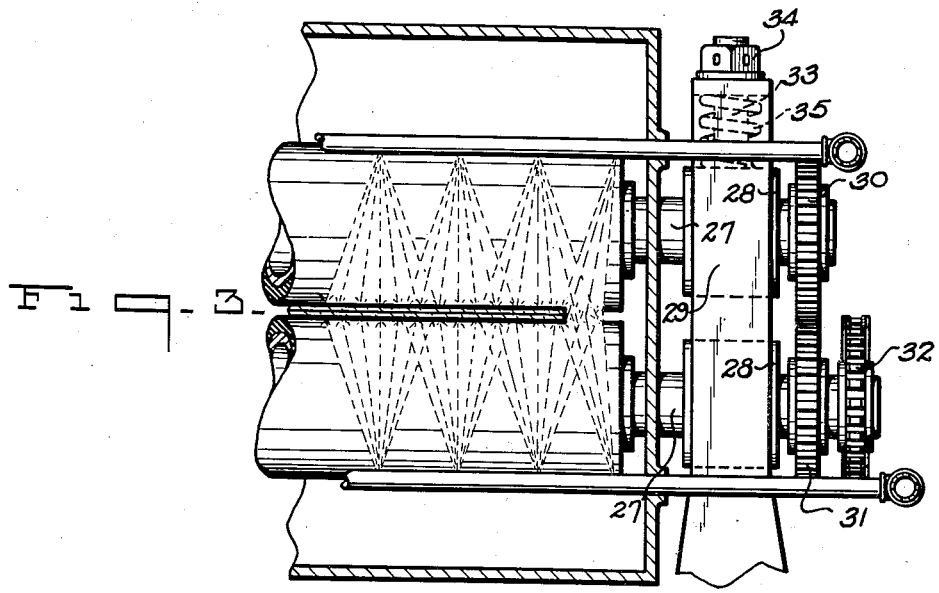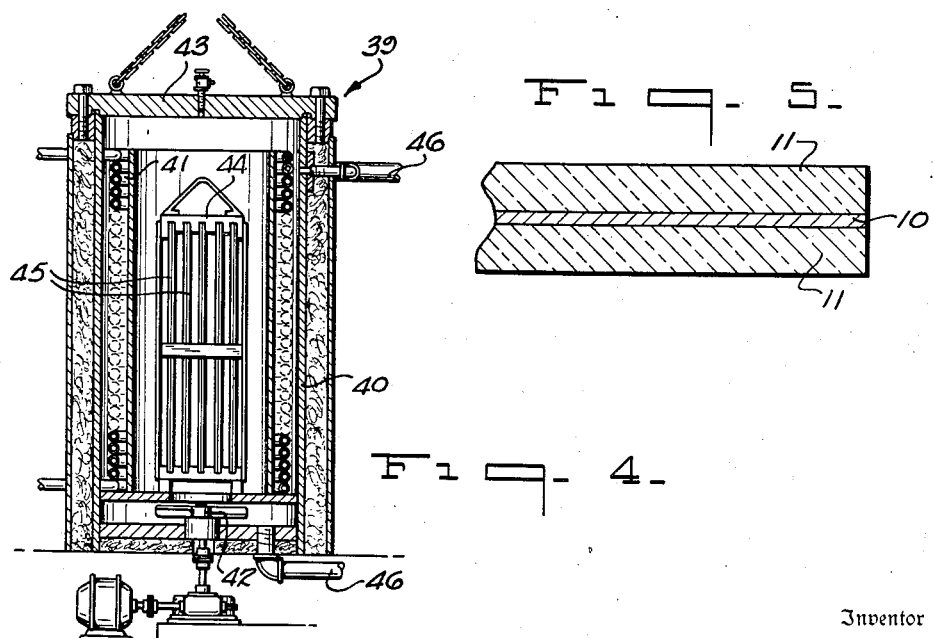

Patented Jan. 29, 1935

1,989,388

UNITED STATES PATENT OFFICE 1,989,388

PROCESS AND APPARATUS FOR PRODUCING SAFETY GLASS

George B. Watkins, Toledo, Ohio, assignor to Libbey-Owens-Ford Glass Company, Toledo, Ohio, a corporation of Ohio Application November 14, 1931, Serial No. 574,982

9 Claims. (Cl. 49—81)

The present invention relates to a process and apparatus for producing safety glass.

Safety glass as known today comprises two sheets of glass and an interposed layer of plastic material bonded thereto. There are numerous plastic layers and bonding agents that can be used in the production of safety glass and the present invention is in no way limited to any particular plastic or bonding material.

Ordinarily, in making safety glass, the laminations are treated with the bonding materials and then arranged in proper superimposed relationship and subjected to the combined action of heat and pressure.

The present invention relates more particularly to a novel process and apparatus for use in the pressing of the assembled laminations in a manner to bring the adjacent faces of the laminations into intimate contact with one another.

An important object of the invention is to provide such a process and apparatus wherein, after the laminations have been assembled into sandwich form, the sandwich can be passed through a series of compressible rolling members, and while being rolled, subjected to the action of a fluid spray whose temperature can be properly controlled so that, coupled with the pressing, a proper bonding action will be obtained between the laminations.

A further object of the invention is to make use of a continuous roller type of pressing instrumentality that will permit of subsequent immersion of the pressed sandwich unprotected into a bath of fluid under pressure to complete the compositing operation.

A still further object of the invention is to subject the marginal portions of the sandwich to the action of a solvent or mixture of solvents during the pressing with the roller devices so that the marginal portions of said plastic will tend to swell in a manner to "seal" the edges of the safety glass, thereby permitting satisfactory immersion of the unprotected sandwich in a bath of fluid under pressure to complete the compositing operation.

Other objects and advantages of the invention will become more apparent during the course of the following description when taken in connection with the accompanying drawings.

In the drawings wherein like numerals are employed to designate like parts throughout the same, Fig. 1 is a fragmentary sectional view illustrating the laminations in spaced relation but in proper superimposed relationship, Fig. 2 is a vertical longitudinal section illustrating somewhat diagrammatically my improved pressing device, Fig. 3 is a fragmentary vertical transverse section thereof, Fig. 4 is a diagrammatic representation of an autoclave that can be used, and Fig. 5 is a fragmentary sectional view of a finished sheet of safety glass.

In Fig. 1, the numeral 10 designates a layer of plastic material arranged between the glass sheets 11. The plastic layer can be any suitable cellulose ester, for example pyroxylin plastic and cellulose acetate, and prior to being arranged between the glass sheets can be treated with bonding material or not depending upon the particular process used in the making of the safety glass. In some processes, the inner surfaces of the glass sheets are provided with skin coats, layers of adhesives, or other bonding material, but as stated above, the present invention is in no way limited to any particular ingredients.

However, assuming that the laminations 10 and 11 have been properly treated and arranged in superimposed relationship, a so-called sandwich is formed, namely, a layer of plastic material faced on both sides with a sheet of glass. It has been customary in the past to place the thus assembled sandwich in a platen press and there subject it to the combined action of heat and pressure.

It is an aim of the present invention to eliminate the necessity for the use of the so-called platen press. There are numerous objections, in my opinion, to the use of a platen press in the manufacture of safety glass. One of these objections is the limitation as to production. It takes time to place the glass into a platen press, close the platens, and subject the sandwich to the heat and pressure, and to then remove the sandwich. Further, cushioning means are ordinarily required and there are other objections well known in the art.

In accordance with the present invention, after assembly of the laminations, the sandwich is passed through a series of oppositely disposed rolls in a manner to exclude the non-condensable gases from between the laminations and to then bring the adjacent surfaces of the laminations into intimate contact. It is also preferred that during the passage of the sandwiches through the rolling system, sprays of fluid, preferably cellulose ester solvents, be played upon the glass whereby to control the temperature of the glass and to also act upon the exposed marginal portions of the plastic layer.

As is shown in Figs. 2 and 3, a series of pairs of rolls 12 are provided, one roll in each pair being positioned over the other. Some of the rolls are disposed within the housing 13 which is provided at both ends with the openings 14 to permit of ingress and egress of the sandwiches 15 and at the same time, for all practical purposes, enclosing the series of rolls arranged therein. The bottom of the housing 13 may be inclined downwardly toward the outlet 15', provided with a strainer 16, and connected to a reservoir tank 17.

Mounted within the housing 13 is a series of perforated pipes 18, some of the pipes being placed above the upper line of rolls and some beneath the lower line of rolls. The pipes are positioned in a manner that they will discharge a spray of fluid 19 upon the glass. The fluid 19 is pumped from the tank 17 by the pump 20 through the heat exchanger 21 and then through the conduit 22 to which is connected the longitudinally extending pipes 23 and 24 serving as sources of supply for the upper and lower pipes 18.

The rolls illustrated comprise a metal core 25 covered with a compressible material 26, preferably a rubber composition. The rolls are carried on the shafts 27, shown in Fig. 3, extending through the journals 28 mounted in the standard 29. The upper shaft 27 also carries the pinion 30, while the lower shaft carries the pinion 31 and also the sprocket 32 over which a sprocket chain may be trained and connected to a suitable source of motive power. The pinions 31 and 32 intermesh, and upon rotation of the lower shaft 27, the two rolls will be positively driven in opposite directions. The teeth of the pinions can be of sufficient length to permit of the necessary adjustment between the rolls without disengagement of the pinions.

To get a proper synchronization, all of the roll drives can be geared together and operated from a single source of supply. However, the invention is in no way limited to any particular drive mechanism, although it is preferred that the peripheral speed of all of the rolls be substantially identical to eliminate as much as possible a tendency toward relative movement between the laminations of the sandwich being passed between the rolls.

In the showing of Fig. 3, the upper bearing 28 is slidably mounted in the standard 29, a threaded shaft 33 being connected thereto and extending through the top of the standard and carrying a nut 34. A spring 35 is interposed between the top of the standard and the bearing 28. This arrangement will permit of a variation of gap between the upper and lower rolls in any given pair, although if the glass to be pressed is of substantially uniform thickness, the floating feature may be dispensed with. In any event, the spring 33 should be of sufficient strength to resist slight tendencies toward separation of the rolls, as an important part of the invention is to exert a substantially uniform and constant pressure upon the glass during the pressing thereof.

I prefer that the rolls be of relatively small diameter and placed closely adjacent to one another, although good results have been obtained when the pairs of rolls are somewhat spaced from one another.

To press a sandwich, it is placed upon the conveyor 36 which advances the sandwich toward the first pair of rolls 12. The rolls are of course in proper adjusted position and press the laminations toward one another. As the rolls are positively driven, they will advance the sandwich forwardly toward the second pair of rolls. The first set of rolls or first group of rolls are designed to remove the non-condensable gases from between the laminations and upon continued movement of the sandwich between the series of rolls, the laminations will be brought into intimate contact. The fluid, whose temperature is controlled in the heat exchanger 21, is discharged through the pipes 18 onto the glass. The most desirable fluid is a cellulose ester solvent and as it is customary to use pyroxylin plastic as the non-brittle layer, diethylene glycol can be used to advantage. However, other solvents or mixtures can be used in lieu of diethylene glycol, and by way of example, it may be pointed out that the dibutyl phthalate, diamyl phthalate, and the like, can be substituted for the diethylene glycol suggested.

As is shown in Fig. 3, the perforated pipes are so mounted that the diethylene glycol or other solvent will be sprayed upon the outer surfaces of the glass sheets and also at the edges of the laminations. The diethylene glycol, when used in this manner, performs two functions: It controls the temperature of the glass during the pressing between the rolls; and it acts upon the marginal portions of the plastic layer between the glass in a manner to cause a slight swelling thereof which is sufficient to effectively "seal" the edges of the sandwich. The number of rolls employed in the machine is dependent upon the size of rolls, speed at which the glass is to be pressed, and other variable factors.

The last pair of group of rolls is designed to act as squeegee rolls to remove excess fluid from the surfaces of the glass. The conveyor 37 is provided to receive the sandwich 38 passing from the pre-pressing device.

After pressing with the roller device as described, the final pressure treatment can be given to the sandwich in an autoclave. The numeral 39 represents an autoclave in its entirety, and as shown in Fig. 4, the autoclave comprises an outer housing 40 provided with an internal heat exchanger 41, and an agitating device 42. By means of the removable top 43, a rack 44, containing a number of pre-pressed sandwiches 45, can be placed in and removed from said autoclave. After the rack of glass has been placed in the autoclave and the top securely fastened, fluid under pressure can be circulated through the pipes 46 and through the autoclave in a manner to subject the laminations to a final pressing cycle.

By reason of the treatment of the sandwich with my novel pre-pressing equipment, the pre-pressed sandwiches can be immersed directly into the autoclave without protection of any kind. Due to the "swelling" action of the solvent upon the plastic layer between the glass sheets, the pressing fluid in the autoclave will be prevented from noticeably seeping between the laminations. However, it is preferred that a cellulose ester solvent be used in the autoclave, although this is not always necessary when the sandwiches have been treated with the solvent in the pre-pressing equipment.

The use of the solvent spray with the rolling apparatus is of considerable importance, and I have found that the series of rolls will not give the same satisfactory results when the solvent spray is not used, although under some conditions, it may be possible to eliminate the spray. Again heated air may be used.

It has been found that in the actual production of commercial glass, sandwiches can be pre-pressed with the type of apparatus illustrated in the drawings and then placed in the autoclave without any platen press treatment. Obviously, the series of pairs of rolls 12 should be accurately mounted and adjusted so that the glass will not be placed under unnecessary strain during the pre-pressing cycle. If the rolls are arranged in proper alignment, safety glass sandwiches can be passed therethrough and pressed together while simultaneously being acted upon by the solvent spray, in a very satisfactory manner.

I claim:

1. The process of producing safety glass comprising two sheets of glass and an interposed layer of tough transparent plastic material adherent to the inner surfaces of the glass, including the arranging of the treated laminations in proper superimposed relationship, then subjecting the sandwich thus formed to a mechanical pressing action, and simultaneously treating the sandwich with a heated liquid spray.

2. The process of producing safety glass comprising two sheets of glass and an interposed layer of tough transparent plastic material adherent to the inner surfaces of the glass, including the arranging of the treated laminations in proper superimposed relationship, then subjecting the sandwich thus formed to a rolling pressing action, and simultaneously treating the sandwich with a heated liquid spray.

3. The process of producing safety glass comprising two sheets of glass and an interposed layer of tough transparent plastic material adherent to the inner surfaces of the glass, including the arranging of the treated laminations in proper superimposed relationship, then subjecting the sandwich thus formed to a rolling pressing action, and simultaneously subjecting the sandwich to the action of a heated spray which is a solvent for the interposed plastic layer.

4. The process of producing safety glass comprising two sheets of glass and an interposed layer of cellulosic material adherent to the inner surfaces of the glass, including the arranging of the treated laminations in proper superimposed relationship, then subjecting the sandwich thus formed to a rolling pressing action, and simultaneously subjecting the sandwich to the action of a heated cellulosic plastic solvent spray.

5. The process of producing safety glass comprising two sheets of glass and an interposed layer of cellulosic material adherent to the inner surfaces of the glass, including the arranging of the treated laminations in proper superimposed relationship, then passing the sandwich thus formed through a series of pairs of pressing devices, and simultaneously spraying a heated cellulosic plastic solvent upon the surfaces of the sandwich to control the temperature thereof.

6. The process of producing safety glass comprising two sheets of glass and an interposed layer of tough transparent plastic material adherent to the inner surfaces of the glass, including the arranging of the treated laminations in proper superimposed relationship, then subjecting the sandwich thus formed to a rolling pressing action while simultaneously spraying the sandwich with a heated temperature controlling liquid in a manner to preliminarily press the laminations, and then subsequently immersing the pre-pressed sandwich into a bath of fluid under pressure whereby to complete the compositing operation.

7. The process of producing safety glass comprising two sheets of glass and an interposed layer of cellulosic material adherent to the inner surfaces of the glass, including the arranging of the treated laminations in proper superimposed relationship, then passing the sandwich thus formed through a series of pairs of yieldable rolling devices while simultaneously directing sprays of heated cellulosic plastic solvent upon all outer surfaces of the sandwich in a manner to preliminarily press the same, and then subsequently immersing the pre-pressed sandwich into a bath of fluid under pressure whereby to complete the compositing operation.

8. An apparatus for use in the manufacture of laminated safety glass, comprising a series of pairs of rolls mounted in substantially a common plane, means for positively driving said rolls in a manner that a sandwich consisting of two sheets of glass and an interposed plastic layer can be passed therebetween and pressed, and means arranged on both sides of the sandwich passing through the rolls for directing sprays of heated liquid upon all outer surfaces of the sandwich.

9. An apparatus for use in the manufacture of laminated safety glass, comprising a series of pairs of rolls mounted in substantially a common plane, means for positively driving said rolls in a manner that a sandwich consisting of two sheets of glass and an interposed plastic layer can be passed therebetween and pressed, means arranged on both sides of the sandwich passing through the rolls for directing sprays of heated liquid upon all outer surfaces of the sandwich, and means for controlling the space between the rolls in each pair for determining the pressure exerted by said rolls upon the sandwich moving therebetween.

GEORGE B. WATKINS.